United States Patent
Huang

(10) Patent No.: US 9,310,997 B2
(45) Date of Patent: Apr. 12, 2016

(54) METHOD, TOUCH DEVICE AND COMPUTER PROGRAM PRODUCT FOR CONVERTING TOUCH POINTS INTO CHARACTERS

(75) Inventor: Hung-Chi Huang, Hsinchu (TW)

(73) Assignee: MSTAR SEMICONDUCTOR, INC., Hsinchu (TW)

( * ) Notice: Subject to any disclaimer, the term of this patent is extended or adjusted under 35 U.S.C. 154(b) by 55 days.

(21) Appl. No.: 13/598,878

(22) Filed: Aug. 30, 2012

(65) Prior Publication Data
US 2013/0057494 A1 Mar. 7, 2013

(30) Foreign Application Priority Data
Sep. 5, 2011 (TW) .............................. 100131982 A

(51) Int. Cl.
*G06F 3/0488* (2013.01)
*G06K 9/00* (2006.01)

(52) U.S. Cl.
CPC ........ *G06F 3/04883* (2013.01); *G06K 9/00402* (2013.01)

(58) Field of Classification Search
CPC ............... G06F 3/04883; G06K 9/222; G06K 9/00402; G06K 9/2081; G06K 9/6807
See application file for complete search history.

(56) References Cited

U.S. PATENT DOCUMENTS

| | | | | |
|---|---|---|---|---|
| 4,132,976 A * | 1/1979 | Siegal | ................ | G06K 9/00429 235/495 |
| 4,275,381 A * | 6/1981 | Siegal | ..................... | G06K 9/18 235/495 |
| 5,615,285 A * | 3/1997 | Beernink | ...................... | 382/189 |
| 5,864,635 A * | 1/1999 | Zetts et al. | ...................... | 382/187 |
| 5,903,668 A * | 5/1999 | Beernink | ...................... | 382/187 |
| 6,340,967 B1 * | 1/2002 | Maxted | ...................... | 345/179 |
| 6,694,056 B1 * | 2/2004 | Ito | ......................... | G06K 9/222 382/186 |
| 6,707,942 B1 * | 3/2004 | Cortopassi et al. | ........... | 382/186 |
| 7,499,589 B1 * | 3/2009 | Cortopassi et al. | ........... | 382/186 |
| 2005/0089226 A1 * | 4/2005 | Chang et al. | ...................... | 382/181 |
| 2005/0270289 A1 * | 12/2005 | Momose | ...................... | 345/443 |
| 2007/0177801 A1 * | 8/2007 | Kawamoto et al. | ........... | 382/187 |
| 2008/0232690 A1 * | 9/2008 | Saund et al. | .................. | 382/187 |
| 2009/0213085 A1 * | 8/2009 | Zhen et al. | ...................... | 345/173 |
| 2011/0190053 A1 * | 8/2011 | Kawamoto et al. | ............. | 463/31 |

FOREIGN PATENT DOCUMENTS

TW 200723074 A 6/2007

OTHER PUBLICATIONS

Taiwan Patent Office, "Office Action", Apr. 17, 2014.

* cited by examiner

*Primary Examiner* — Aneeta Yodichkas
*Assistant Examiner* — Richard Hong
(74) *Attorney, Agent, or Firm* — WPAT, PC; Justin King

(57) ABSTRACT

The disclosure is related to a method, a touch device and a computer program product for converting touch points into characters. In particular, through an input interface, the converting method can be applied to the touch device and the computer program product. The converting method for example includes the following steps of: sensing at least one touch point triggered by a user on the input interface to obtain touch point number information and touch point position information; generating a touch point distribution of the sensed touch point(s) according to the touch point number information and the touch point position information; and determining an input character according to the touch point distribution.

16 Claims, 10 Drawing Sheets

| character | touch point number information | touch point position information | |
|---|---|---|---|
| | | θ | d |
| 0 | 1 | 270° | d₀ |
| 0 | 1 | 270° | d₀ |

ABCDEFGHIJKLMN
OPQRSTUVWXYZ
0123456789

FIG. 1

$\theta_0 = \theta_0 = 270°$
$d_0 < d_0$

| character | touch point number information | touch point position information ||
|---|---|---|---|
| | | $\theta$ | $d$ |
| 0 | 1 | 270° | $d_0$ |
| 0 | 1 | 270° | $d_0$ |

| character | touch point number information | touch point position information ||
|---|---|---|---|
| | | $\theta$ | d |
| D | 1 | 300° | $d_D$ |
| S | 1 | 315° | $d_S$ |

| character | touch point number information | touch point position information |
|---|---|---|
| Y | 4 | (1, 3, 5, 8) |
| A | 3 | (2, 7, 9) |

METHOD, TOUCH DEVICE AND COMPUTER PROGRAM PRODUCT FOR CONVERTING TOUCH POINTS INTO CHARACTERS

FIELD OF THE INVENTION

The disclosure generally relates to multi-touch methods, touch devices and computer program products, and more particularly to a multi-touch method, a touch device and a computer program product for converting touch points into characters according to relative position information of the touch points.

BACKGROUND OF THE INVENTION

With the development of technology, the input manner for an electronic device has been changed from physical key click to touch control. One of the inputting manner is using finger to write on a touch panel to input, and the other is selecting characters on a virtual keyboard displayed on screen to input.

The former manner is letting user's fingers control to write characters on a touch device. The latter manner is letting a user change a cursor position via key-clicking on a controller to select characters on a virtual keyboard and then clicks a confirm key on the controller to confirm the characters to input. However, both manners fail in speed. Taking inputting word "apple" for an example. The user needs to sequentially handwrite the letters "a", "p", "p", "l" and "e", i.e., totally finish seven strokes (each "p" consists of two strokes), and the touch device can only recognize the input content after these seven strokes are completely finished. If the user input characters with complicated strokes or input a sentence, apparently handwriting to input is too slow.

With regard to the virtual keyboard input, the user needs to select each character on the virtual keyboard by a cursor and then confirm each selection of the word. That is, after the user selecting "a" and clicking a confirm key, the user needs to move the cursor to "p" and clicks the confirm key again. The process of moving cursor and clicking confirm key should be repeated till the rest characters are confirmed. This kind of input method limits the input speed.

In short, the input speed is limited in the conventional input manners as mentioned above. Highly demand of improving the character input speed is required.

SUMMARY OF THE INVENTION

In one aspect, an embodiment of the disclosure provides a method of converting touch points into characters applied to an input interface. The method comprises the following steps of: sensing at least one touch point triggered by a user on the input interface to obtain touch point number information and touch point position information for the sensed at least one touch point; generating a touch point distribution of the sensed at least one touch point according to the touch point number information and the touch point position information; and determining an input character according to the touch point distribution.

In another aspect, an embodiment of the disclosure provides a touch device for converting touch points into characters. The touch device comprises a recognition unit and a control unit. The recognition unit is configured (i.e., structured and arranged) for sensing at least one touch point triggered by a user on an input interface to obtain touch point number information and touch point position information for the sensed at least one touch point. The control unit is coupled to the recognition unit. The control unit is configured for generating a touch point distribution of the sensed at least one touch point according to the touch point number information and the touch point position information, and determining an input character according to the touch point distribution.

In still another aspect, an embodiment of the disclosure provides a computer program product stored with a software program therein for use with an input interface and executable for causing an electronic device with a control unit to perform a method of converting touch points into characters. The method comprises the following steps of: sensing at least one touch point triggered by a user on the input interface to obtain touch point number information and touch point position information; generating a touch point distribution of the sensed at least one touch point according to the touch point number information and the touch point position information; and determining an input character according to the touch point distribution.

BRIEF DESCRIPTION OF THE DRAWINGS

The above embodiments will become more readily apparent to those ordinarily skilled in the art after reviewing the following detailed description and accompanying drawings.

FIG. 1 is a schematic diagram illustrating that touch point positions correspond to various different characters in accordance with an exemplary embodiment.

DETAILED DESCRIPTION OF THE PREFERRED EMBODIMENT

The disclosure will now be described more specifically with reference to the following embodiments. It is to be noted that the following descriptions of embodiments are presented herein for purpose of illustration and description only. It is not intended to be exhaustive or to be limited to the precise form disclosed.

It is known that the conventional touch device could not provide a fast and simple method in the aspect of character input. Accordingly, the disclosure provides a converting method capable of quickly converting touch points into characters according to touch point distribution information derived from the touch points triggered by a user.

FIG. 1 is a schematic diagram illustrating that touch point positions correspond to various different characters in accordance with an exemplary embodiment. Although FIG. 1 takes English letters and Arabic numerals as examples, in practical applications, other the types of characters such as various kinds of symbols, phonetic letters or numerals etc., can be determined as input according to predefined relationships with touch points. It is also noted that the numbers and/or positions of touch points associated with corresponding characters such as English letters and/or Arabic numerals can be modified or redefined, and are not limited to the illustration of FIG. 1.

As depicted in FIG. 1, three end points of the English letter "A" are used as a touch point reference for the determination of an input letter "A". In other words, when three touch points are sensed on an input interface and the distribution of the sensed three touch points are similar to three vertices of a isosceles triangle with low bottom side, the combination of such three touch points is determined as the input of the character "A" based on the touch point position definition depicted in FIG. 1.

Therefore, in one aspect, an inventive concept of the disclosure basically uses the number and relative positions of touch points to represent a touch point distribution and then determines a corresponding character as input based on the touch point distribution.

In addition, as depicted in FIG. 1, although each of the English letters "D", "O", "S" and the Arabic numerals "0", "1", "8" is corresponding to single one touch point, these letters and Arabic numerals still can be distinguished based on position differences on the input interface among the touch points corresponding thereto.

FIGS. 2A, 2B, 2C and 2D are schematic diagrams of determining a character corresponding to single one touch point as the English letter "O" or the Arabic numeral "0" for input according to the touch point position definitions of characters depicted in FIG. 1.

Figure 2A:
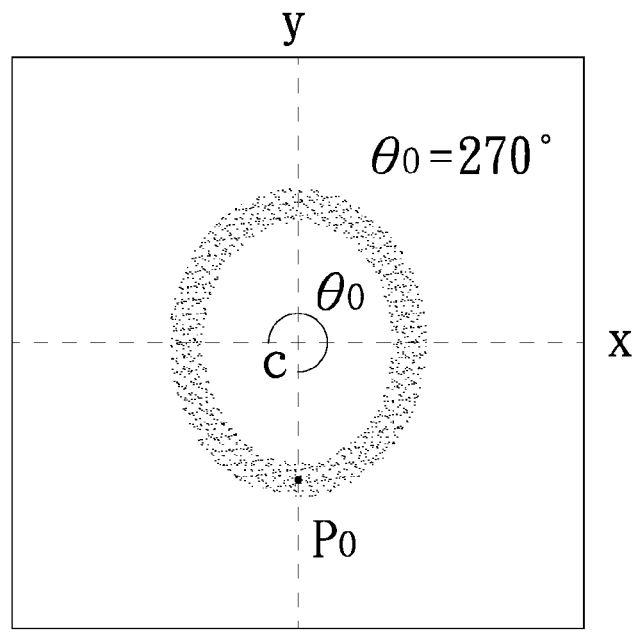
FIGS. 2A, 2B, 2C and 2D are schematic diagrams of determining a character defined corresponding to single one touch point as the English letter "O" or the Arabic numeral "0" for input based on the touch point position definitions of characters depicted in FIG. 1.
Figure 2B:
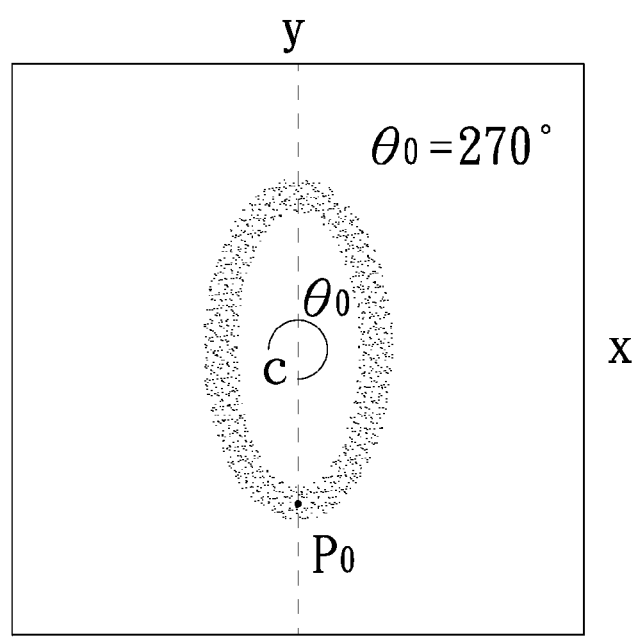

As depicted in FIGS. 2A and 2B, touch points Po and P0 respectively representative of the English letter "O" and the Arabic numeral "0" both are located on a vertical central axis y of a touch sensing region. That is, if $\theta_O$ and $\theta_0$ are respectively used as intersection angles of the touch points $P_O$, $P_0$ with respect to the horizontal central axis x, then $\theta_O = \theta_0 = 270°$.

Figures 2C, 2D:
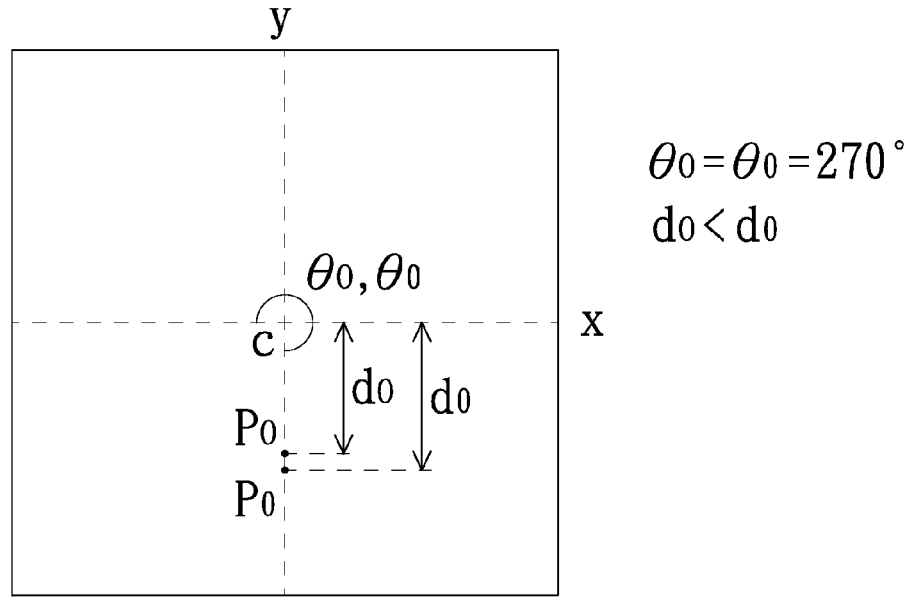

For clearly illustrating the difference between the touch points respectively corresponding to the English letter "O" and the Arabic numeral "0", both the touch points $P_O$ and $P_0$ are depicted together in FIG. 2C.

As depicted in FIG. 2C, a distance between the touch point $P_O$ and a central coordinate point c is $d_O$, and another distance between the touch point $P_0$ and the central coordinate point c is $d_0$. Because $d_O < d_0$, if the distance between a touch point triggered by a user on the input interface and the central coordinate point c is determined to be relatively short, the character desired by the user will be determined to be the English letter "O" rather than the Arabic numeral "0" as input.

Therefore, even two characters are defined to have a same touch point number and a same intersection angle, the desired character still can be determined according to the distance between the triggered touch point and the central coordinate point.

In addition, FIG. 2D is a schematic diagram of a lookup table which is stored in a storage unit of a touch device and recording touch point number information and touch point position information of the touch points Po, P0 respectively corresponding to the English letter "O" and the Arabic numeral "0".

As depicted in the lookup table, the touch point distribution representative of the English letter "O" contains information such as touch point number information of 1 and touch point position information of 270° and $d_O$, where 270° indicates the intersection angle of the touch point Po with respect to the horizontal central axis x, and $d_O$ indicates the distance between the touch point Po and the central coordinate point c. Once the touch device through an input interface recognizes the position of touch point is matched with the touch point distribution representative of the English letter "O", the character as desired by user for input will be determined to be the English letter "O".

Likewise, when the touch device recognizes the position of touch point is matched with the touch point distribution representative of the Arabic numeral "0", the character as desired by user for input will be determined to be the Arabic numeral "0".

As depicted in FIG. 2D, when the touch point number information indicates single one touch point is sensed, the user is determined to only trigger one touch point on the input interface, and the touch point is referred as a first touch point located at a first coordinate position on the input interface. Correspondingly, the touch point position information representative of the first touch point contains the first coordinate position represented by the intersection angle θ and the distance d.

FIGS. 3A, 3B, 3C and 3D are schematic diagrams of determining a character corresponding to single one touch point as the English letter "D" or "S" for input according to the touch point position definitions of characters depicted in FIG. 1.

Figure 3A:
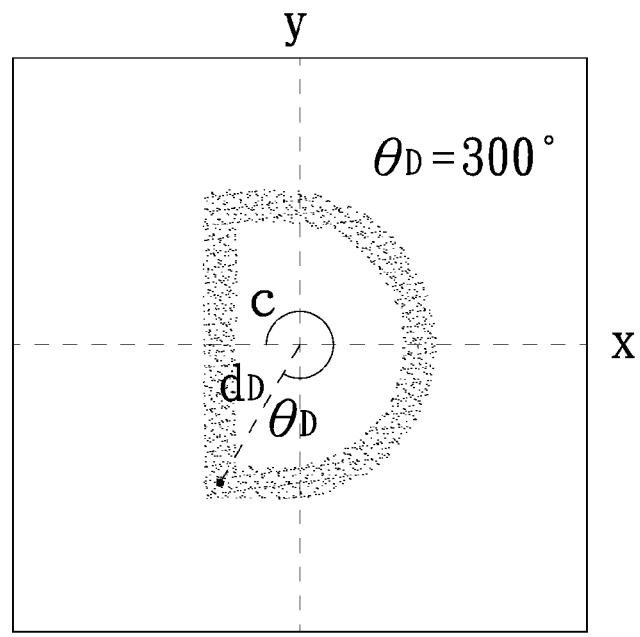
FIGS. 3A, 3B, 3C and 3D are schematic diagrams of determining a character defined corresponding to single one touch point as the English letter "O" or "S" for input based on the touch point position definitions of characters depicted in FIG. 1.
Figure 3B:
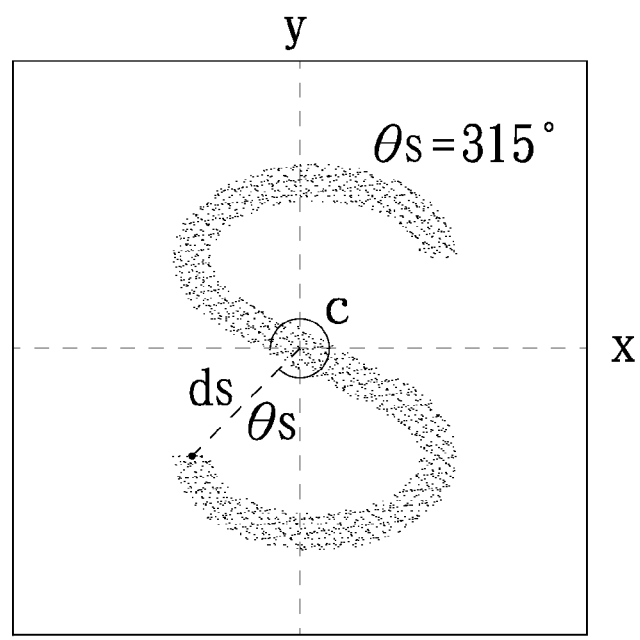

As depicted in FIGS. 3A and 3B, a touch point $P_D$ representative of the English letter "D" and a touch point $P_S$ representative of the English letter "S" both are located at the left-bottom of a touch sensing region, and distances between the two touch points and the central coordinate point c are the same. That is, if $d_D$ and $d_S$ are defined to be distances between the touch points $P_D$, $P_S$ respectively representative of the English letters "D", "S" and the central coordinate point c, then $d_D = d_S$. if $\theta_D$, $\theta_S$ are defined as intersection angles of the touch points $P_D$, $P_S$ respectively representative of the English letters "D", "S" with respect to the horizontal central axis x, then $\theta_D = 300°$ and $\theta_S = 315°$.

Figures 3C, 3D:
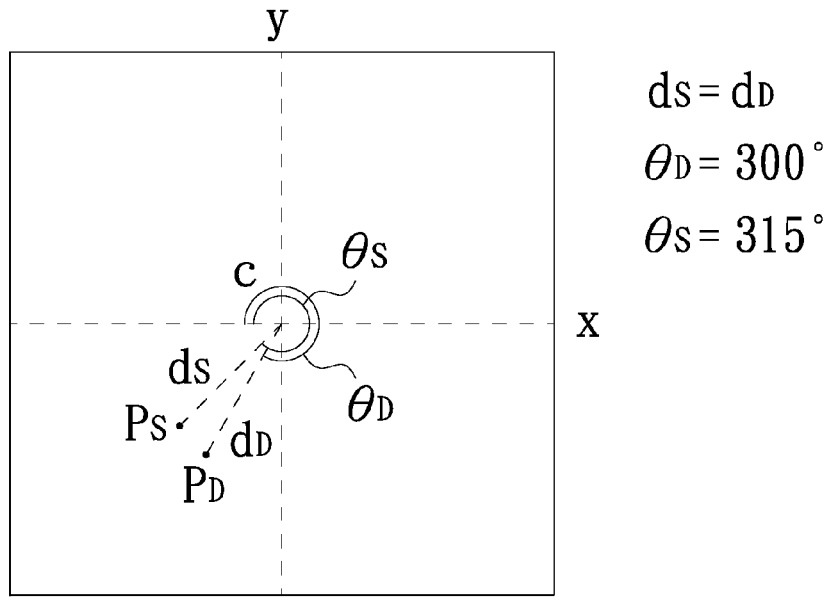

For clearly illustrating the difference between the touch points $P_D$, $P_S$ respectively representative of the English letters "D", "S", both the touch points $P_D$, $P_S$ are depicted together in FIG. 3C. As depicted in FIG. 3C, even the user only triggers single one touch point in each touch control operation and the distances between the touch points $P_D$, $P_S$ and the central coordinate point c are the same, the character entered by the user still can be determined as input according to the intersection angle of the single one touch point with respect to the horizontal central axis x.

Of course, in practical applications, the generation of touch point position information is not limited to the above-described, other method also can be used together with the inventive concept of the disclosure. For example, an intersection angle between a connecting line from a touch point to the central coordinate point c and a vertical central axis y can be used as the touch point position information, or a distance between the touch point and the central coordinate point c together with a diameter degree can be used to represent the touch point position information instead.

Alternatively, a switching mechanism can be set in the touch device. Through the switching mechanism, the user is allowed to switch between a numerical coordinate and a letter coordinate. For example, the touch point number of 1 represents the numeral "1" when the user switches to the numerical coordinate; and the touch point number of 1 represents the letter "O" when the user switches to the letter coordinate. The implementation of the switching mechanism may vary based on different application requirements, for example, the switch mechanism can be realized by setting a physical or a virtual button on a touch plane of the touch device.

In addition, FIG. 3D is a schematic diagram of touch point number information and touch point position information respectively representative of the English letters "D" and "S" being stored in a storage unit of the touch device in a form of lookup table.

In particular, in the second row of the lookup table of FIG. 3D, the lookup table provides a touch point distribution corresponding to the English letter "D", where the touch point number information is "1", the touch point position information contains an intersection angle θ=300° of the touch point with respect to the horizontal central axis x and the distance $d_D$ of the touch point distant from the central coordinate point c.

In the third row of the lookup table of FIG. 3D, the lookup table provides a touch point distribution corresponding to the English letter "S", where the touch point number information is "1", and the touch point position information contains an intersection angle θ=315° of the touch point with respect to the horizontal central axis x and the distance $d_S$ of the touch point distant from the central coordinate point c.

Since the lookup table provides the touch point distributions respectively corresponding to the English letters "D", "S", once a touch point is sensed and the sensed touch point is determined to be matched with one of the touch point distributions, the character corresponding to the touch point triggered by a user can be determined as input consequently.

It is noted that although in the examples as depicted in FIGS. 2A-2D and 3A-3D the touch point position information is derived from the distance between the touch point and the central coordinate point and the intersection angle between the connecting line from the touch point to the central coordinate point and the horizontal central axis x, in practical applications the touch point distribution representative of a relative position of the touch point can be derived from other biases. In other words, even still using the intersection angle and relative distance as the touch point distribution, there is still a possibility of modification. For example, except the foregoing central coordinate point and the horizontal central axis x, other reference points so as the connecting lines can be used for obtaining the relative distance and the intersection angle.

Figure 4:
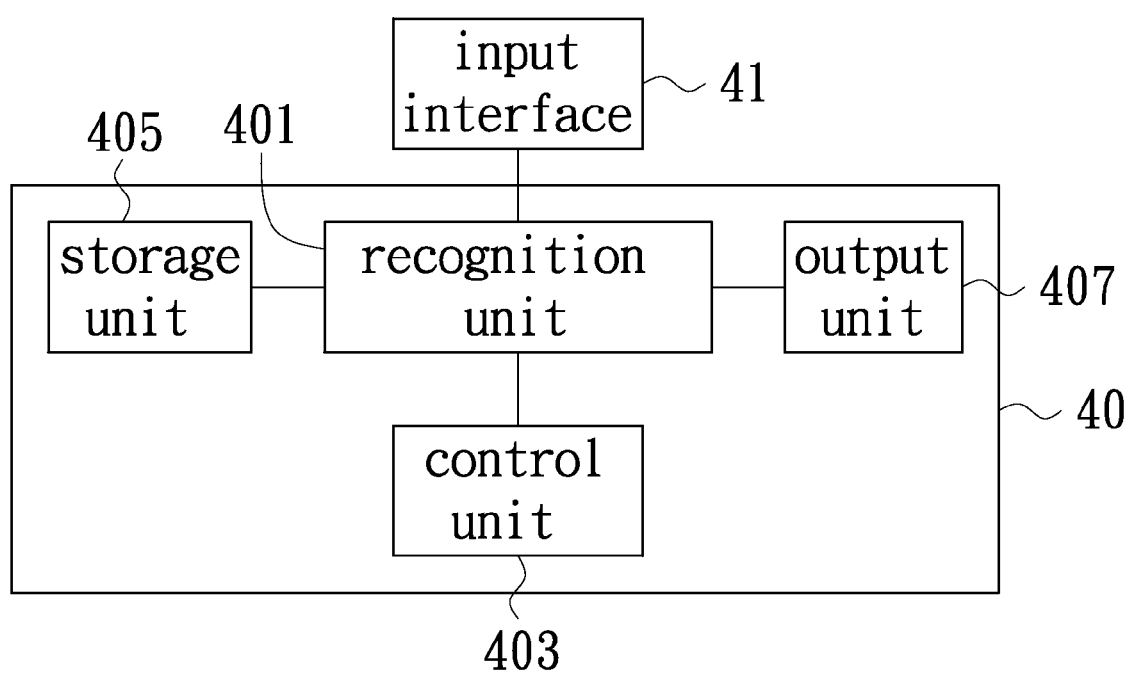
FIG. 4 is a schematic block diagram of a touch device for use with an input interface to convert touch points into characters as input in accordance with an exemplary embodiment.

FIG. 4 is a schematic block diagram of a touch device, for use with an input interface, for converting touch points into characters as input in accordance with an exemplary embodiment. According to the inventive concept of the disclosure, the input interface 41 is not limited to be a physical interface for the generation of touch points. That is, except the general physical touch interface, the input interface 41 may be a virtual sensing plane generated by optical manner.

Moreover, for the general touch device 40, the size and position of the input interface 41 for sensing the input of touch points are not necessary to be predefined. In other words, because the determining of the input character in the disclosure is based on the touch point distribution representative of the relative position of touch point, the input interface 41 may be a any specific sensing region predefined on the touch device 40 or any position on a touch plane provided by the touch device 40.

In other words, as long as the touch point distribution representative of the relative position of touch point is matched with one of distribution parameters in advance stored in the storage unit 405, the character corresponding to the touch point(s) can be determined as input according to the inventive concept of the disclosure.

As depicted in FIG. 4, the touch device 40 in accordance with an exemplary embodiment primarily comprises a recognition unit 401 and a control unit 403 which is electrically coupled to the recognition unit 401. The recognition unit 401 is used for sensing a touch point(s) triggered by a user on the input interface 41 and thereby obtaining touch point number information and touch point position information for the sensed touch point(s). The control unit 403 is used for generating a touch point distribution of the sensed touch point(s) according to the touch point number information and the touch point position information and further determining a character corresponding to the sensed touch point(s) as input according to the touch point distribution.

According to different application requirements, the characters desired as input can be outputted through the output unit 407 optionally. For example, if the characters inputted by a user are a password for identification, the content of the input characters will not be displayed. Alternatively, the content of input characters will be displayed by the output unit 407 such as a display screen or a speaker. In other words, the content of input characters can be outputted in an audio manner or a video manner based on different application requirements when the control unit 403 is electrically connected to the output unit 407.

In addition, the touch device 40 may further comprise a storage unit 405 electrically connected to the recognition unit 401 and the control unit 403. Related information such as a lookup table may be stored in advance in the storage unit 405 for the use of the control unit 403.

Firstly, the storage unit 405 is stored with a lookup table therein containing multiple distribution parameters. Herein it is assumed that the lookup table contains a first distribution parameter corresponding to a letter "A", a second distribution parameter corresponding to a letter "B" and a third distribution parameter corresponding to a letter "C".

After the control unit 403 obtains a touch point distribution derived from the sensed touch points, the obtained touch point distribution is then compared with the first through third distribution parameters in sequence. If the obtained touch point distribution is matched with one of the first through third distribution parameters, the input character is determined as corresponding one. For example, when the result of the comparison between the obtained touch point distribution and the third distribution parameter is true, the character triggered by the user would be determined as the letter "C".

It is noted that the storage format of the distribution parameters in the storage unit 405 and the manner of the control unit 403 comparing the distribution parameters are not limited to the above-described. A hash table, for example, can be used for the storage of the distribution parameters and accordingly the result of a hash function can be used for the distribution parameter lookup and comparison instead.

Furthermore, the touch device 40 as depicted in FIG. 4 can be integrated into a remote controller, so that the user can use the remote controller to carry out both remote control and character input functions. In the situation of the touch device is integrated into the remote controller, a user is not limited to input characters through the touch screen; that is, the user can use physical buttons of the remote controller as anchor points for input instead. For example, the numeric keys 0~9 of the remote controller can be referred as ten anchor points arranged in matrix and used as an input device for the character entering.

To more clearly illustrate the inventive concept of the disclosure, two exemplary embodiments will be described below to explain how to convert touch points into characters as input based on the inventive concept of the disclosure in the circumstance that the number of touch point is more than one (i.e., multiple). In the following, English letters "Y" and "A" are taken as examples as the desired characters.

According to an exemplary embodiment of the disclosure, when the touch point number information indicates multiple touch points are sensed, the obtaining of relative distances and intersection angles can be realized by various different methods since the number of touch point is multiple. For example, the relative distance and intersection angles can be measured based on the distances between the multiple touch points and the central coordinate point, or measured based on the distances and intersection angles formed among the multiple touch points.

When the touch point number information indicates multiple touch points are sensed, the user is determined to trigger at least a first touch point and a second touch point respectively located at a first coordinate position and a second coordinate position on the input interface. In this situation, the touch point number information is the actual number of touch points, and the touch point position information at least contains the first coordinate position and the second coordinate position.

Accordingly, if a first relative distance between the first and second coordinate positions is obtained, or an intersection angle formed between a first connecting line from the first coordinate position to the second coordinate position and the horizontal or vertical central axis is obtained, a corresponding touch point distribution can be obtained and thereby the character desired as input can be determined as a result.

Figure 5A:
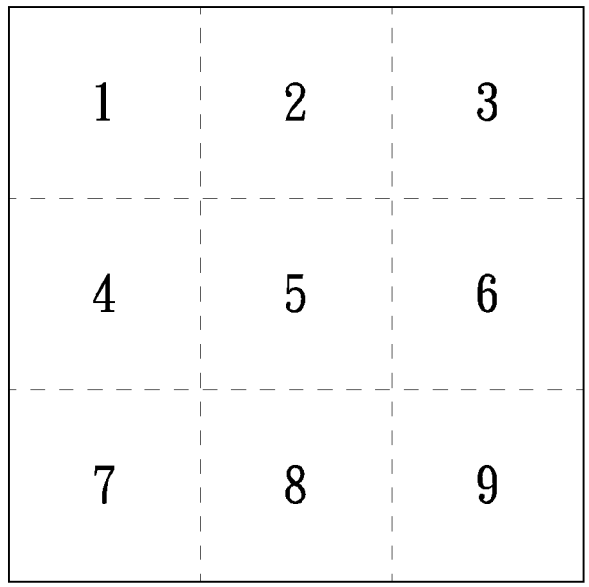
FIG. 5A is a schematic diagram of a touch sensing region of an input interface being demarcated into multiple sub-blocks based on a position allocation in matrix manner in accordance with an exemplary embodiment.

FIG. 5A is a schematic diagram of a touch sensing region of an input interface being demarcated into multiple sub-blocks based on a position allocation in matrix manner in accordance with an exemplary embodiment of the disclosure.

It is noted that although the position allocation in matrix manner uses a matrix formed by 3×3 sub-blocks as an example for illustration, in practical applications, the position allocation matrix can be modified to have other numbers of sub-blocks such as 3×5, 5×5, etc.

As depicted in FIG. 5A, the sensing block on the input interface for sensing touch points is demarcated into nine sub-blocks, and the positions of sensed touch points are relevant to the serial numbers of the nine sub-blocks. For the convenience of description, these nine sub-blocks are respectively labeled as matrix numbers 1~9 in the order of from left to right and from top to bottom. In the following related figures, these matrix numbers will be marked in the bottom right corners of the respective sub-blocks.

In practical applications, it is likely that the position of touch point may locate on a boundary between two sub-blocks rather than just within one sub-block. In this case, the touch device can provide a fault-tolerant function to determine the position of the touch point belongs to which one of the sub-blocks. Because the fault-tolerant judgment and consideration belongs to the range of modification for application, and thus herein will not give further discussion.

Figure 5B:
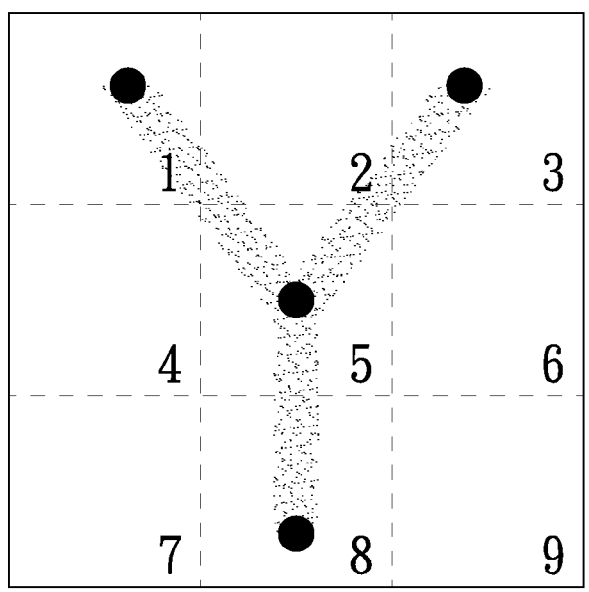
FIG. 5B is a schematic diagram of determining the English letter "Y" as an input character based on the position allocation in matrix manner.

FIG. 5B is a schematic diagram of determining the English letter "Y" as an input character based on the position allocation in matrix manner. As depicted in FIG. 5B, the English letter "Y" is represented by four touch points respectively located in the four sub-blocks with matrix numbers 1, 3, 5 and 8. Accordingly, the touch point number information is "4".

Therefore, when a user performs a touch operation to cause that the recognition unit determines that the touch point number information is "4" and the touch point position information is represented by (1, 3, 5, 8), the character desired by the user as input would be determined to be the English letter "Y" according to the record of the lookup table.

Figures 5C, 5D:
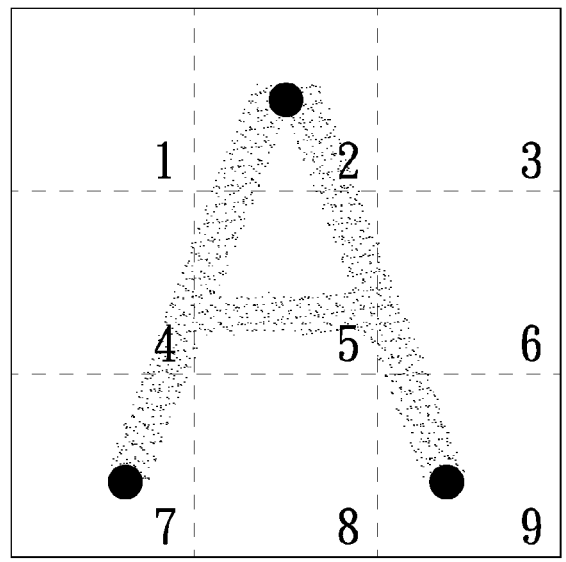
FIG. 5C is a schematic diagram of determining the English letter "A" as an input character based on the position allocation in matrix manner.
FIG. 5D is a schematic diagram of touch point number information and touch point position information corresponding to the English letters "A" and "Y" based on the position allocation in matrix manner being stored in a storage unit in the form of lookup table.

FIG. 5C is a schematic diagram of determining the English letter "A" as an input character based on the position allocation in matrix manner. Similar to the input manner of "Y" as depicted in FIG. 5B, the sub-blocks with the matrix numbers 2, 7, 9 are sensed with touch points. In this circumstance, the touch point number information is "3", and the touch point position information can be represented by (2, 7, 9). Therefore, if the touch point distribution obtained according to the touch points triggered by the user is matched the foregoing combination of the touch point number information of "3" and touch point position information of (2, 7, 9), the character desired by the user for input would be determined to be the English letter "A".

In short, when the touch point number information indicates multiple touch points are sensed, the sensing region on the input interface actually for touch operation can be allocated in matrix manner, so as to obtain coordinate positions of the respective sensed touch points and the matrix numbers corresponding to the coordinate positions. Afterwards, the combination of the matrix numbers corresponding to coordinate positions and the touch point number is taken as a touch point distribution, so as to determine the desired input character.

FIG. 5D is a schematic diagram of touch point number information and touch point position information corresponding to the English letters "A" and "Y" based on the position allocation in matrix manner being stored in the storage unit in the form of lookup table.

As illustrated in the second row of the lookup table depicted in FIG. 5D, the touch point number information of "4" and the touch point position information of (1, 3, 5, 8) corresponding to the English letter "Y" are recorded. In the third row of the lookup table, the touch point number information of "3" and the touch point position information of (2, 7, 9) corresponding to the English letter "A" are recorded.

Once the user performs a touch operation to generate touch points on the input interface, an English letter "Y" or an English letter "A" is determined as input if the touch point distribution obtained according to the touch points is matched with the content in the second row or third row of the lookup table in FIG. 5D.

Figure 6A:
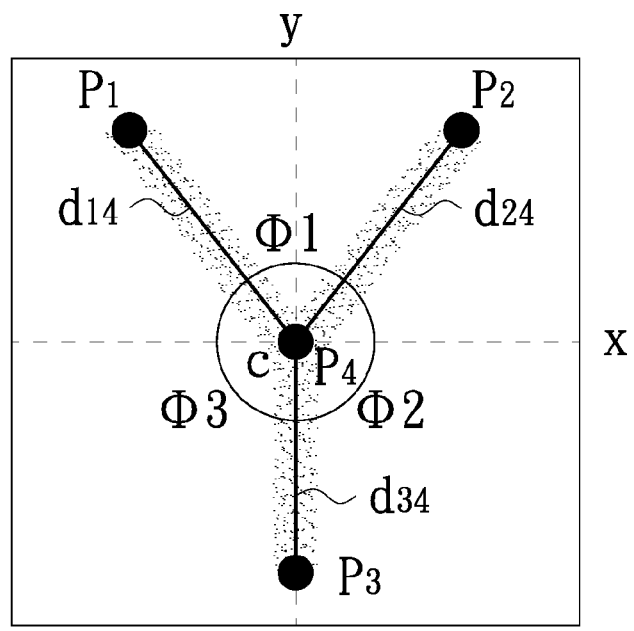
FIG. 6A is a schematic diagram of determining the English letter "Y" as an input character by using relative distances and intersection angles among touch points as the basis of determining.

FIG. 6A is a schematic diagram of determining the English letter "Y" as an input character by using relative distances and intersection angles formed among touch points as the basis of determining.

As depicted in FIG. 6A, the fourth touch point P4 is exactly located at the central coordinate point c, and the first, second and third touch points P1, P2 and P3 respectively are located at the top-left, top-right and direct-bottom of the fourth touch point P4.

In addition, a connecting line d14 is formed by the first and fourth touch points P1 and P4. A connecting line d24 is formed by the second and fourth touch points P2 and P4. A connecting line d34 is formed by the third and fourth touch points P3 and P4. The connecting lines d14, d24 and d34 form three intersection angles φ1, φ2 and φ3 thereamong.

Therefore, when the manner of relative distances and intersection angles formed among the touch points being used as the basis of determining is adopted, a character "Y" is determined as input if the number of sensed touch points is four, and the connecting lines and intersection angles formed among the sensed touch points are matched with the recorded lengths and intersection angles associated with the character "Y".

Figure 6B:
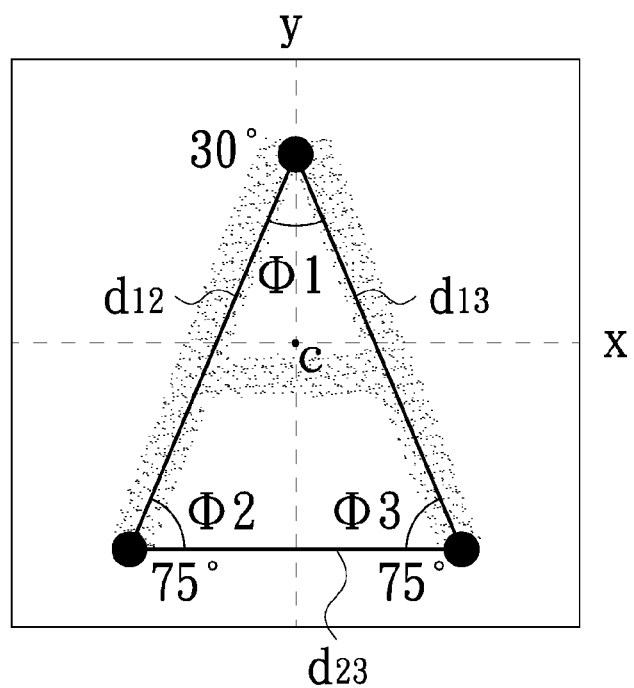
FIG. 6B is a schematic diagram of determining the English letter "A" as an input character by using relative distances and intersection angles among touch points as the basis of determining.

FIG. 6B is a schematic diagram of determining the English letter "A" as an input character by using relative distances and intersection angles formed among touch points as the basis of determining.

As depicted in FIG. 6B, the first, second and third touch points P1, P2 and P3 cooperatively form an isosceles triangle symmetric with respect to a vertical central axis y.

In addition, a connecting line d12 is formed by the first and second touch points P1 and P2, a connecting line d23 is formed by the second and third touch points P2 and P3, and a connecting line d13 is formed by the first and third touch points P1 and P3. The connecting lines d12, d23 and d13 form three intersection angles φ1, φ2 and φ3 thereamong. Lengths of the connecting lines and the intersection angles among the connecting lines can be recorded in advance in the storage unit.

Therefore, when the manner of relative distances and intersection angles formed among sensed touch points being used as the basis of determining is adopted, a character "A" is determined as input if the number of sensed touch points is three, and the connecting lines and intersection angles formed among the sensed touch points are matched with the recorded lengths and intersection angles associated with the character "A".

Of course, since the relative distances and intersection angles formed among the inputted touch points may exist an input error in a practical application, it is needed to set a distance error threshold and an intersection angle error threshold. The compatibility of the determination herein will not be discussed.

Figure 7:
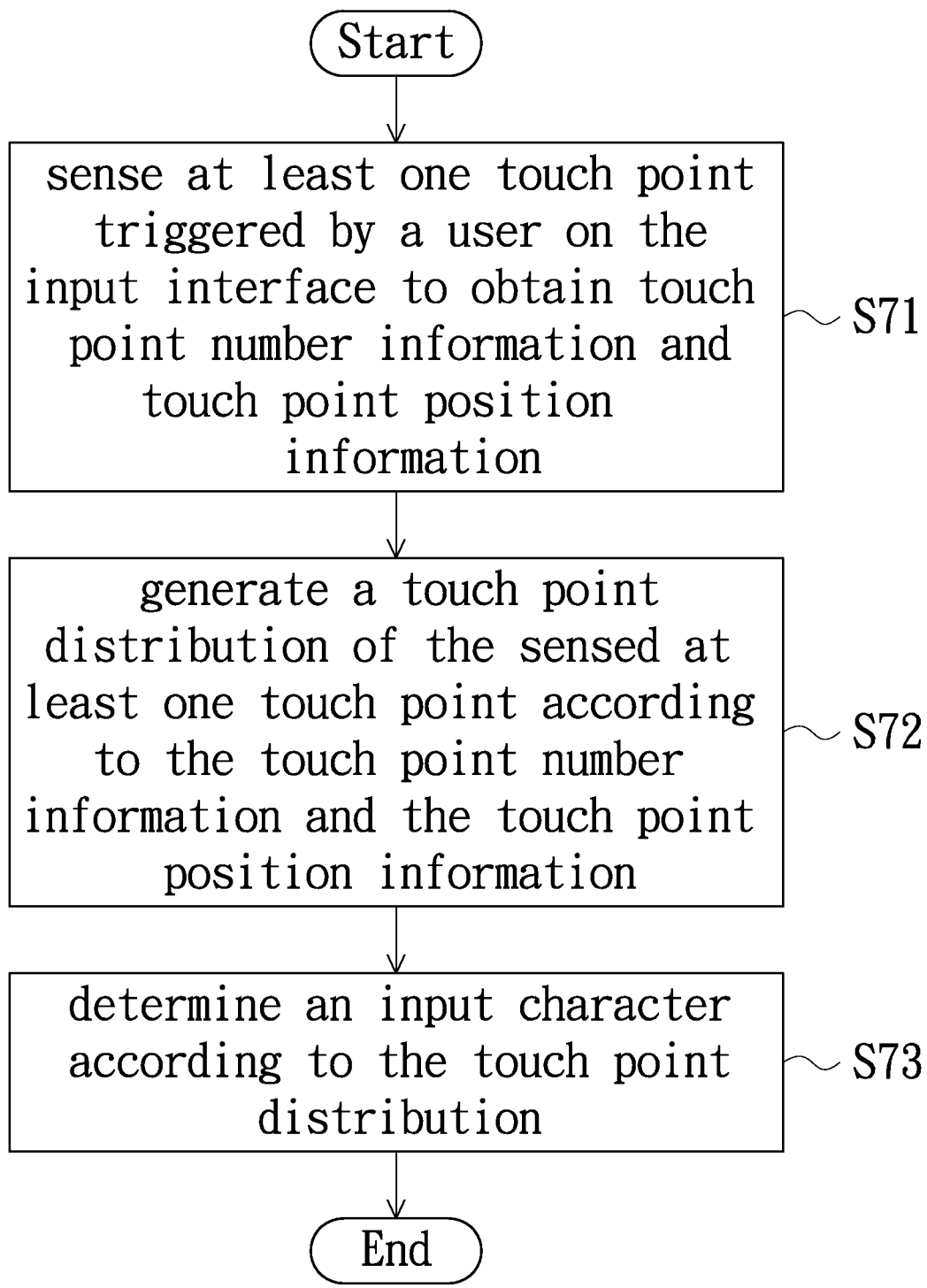
FIG. 7 is a flow chart of a method of converting touch points into characters in accordance with an exemplary embodiment.

According to the foregoing description based on the situations of the numbers of touch point respectively being one and multiple, a method of converting touch points into characters as input of the disclosure can be summarized as depicted in FIG. 7.

FIG. 7 is a flow chart of the method of converting touch points into characters as input in accordance with an exemplary embodiment of the disclosure.

According to the aforementioned exemplary embodiments, the disclosure concept can be summarized as the following steps of: firstly sensing at least one touch point triggered by a user on an input interface and obtaining touch point number information and touch point position information for the sensed touch point(s) (step S71); subsequently generating a touch point distribution indicating a relative position(s) of the sensed touch point(s) according to the touch point number information and the touch point position information (S73); and determining a character as input according to the touch point distribution (step S75).

Moreover, the step S71 can be further explained as: sensing the number and position(s) of the at least one touch point triggered by the user on the input interface in a predetermined period and thereby obtaining the touch point number information and the touch point position information of the sensed touch point(s). Herein, the predetermined period can be preset in the touch device based on an averaged input speed of general users, or can be set by an individual user after trained by an input conversion process after the touch device leaves factory.

For example, the predetermined period, an input period for the recognition unit and the control unit to sense a touch point(s), can be for example set to 1 second thereby the touch point(s) inputted within the predetermined period of 1 second are taken as a same group, and the predetermined period of 1 second can be set in the touch device before leaving factory. Alternatively, the predetermined period can be set to 0.5 second instead after the touch device leaves factory when the user is more familiar with the character input process. Of course, the predetermined period can be adopted with a threshold together. That is, the touch point(s) inputted within a certain time range defined by the predetermined period cooperative with negative and positive values of the threshold are regarded as in a same group.

Furthermore, in some complex applications, the predetermined period can be further divided into different stages. For example, the user may input three touch points in a first stage and input another two touch points in a second stage. The order and relative positions of these five touch points can be used for the determination of the input character. In other words, a relationship between the touch points and the corresponding input character can be flexibly adjusted depending on the definition manner of predetermined period supported by the touch device.

Moreover, the implement of step S73 can vary depending on various different applications. For example, the corresponding character can be determined as input via applying a hash calculation to the touch point distribution; or, the corresponding character can be determined as input via comparing the touch point distribution of triggered touch point(s) with a lookup table containing multiple pre-stored touch point distributions.

To sum up, the method of converting touch points into characters as input of the disclosure can be summarized as the process depicted in FIG. 7. That is, the touch point distributions are functioned as a reference of the relationships between the touch points and the input characters thereby the input characters can be determined through the touch point distributions.

In a touch operation process, the disclosure first uses the touch point number information and touch point position information to represent at least one touch point which is triggered by a user on the input interface, and then determines a corresponding character as input through the touch point distribution which is derived from the touch point number information and touch point position information. Because the derivation of the touch point distribution and the determination of the input character can be fast executed in the touch device based on the concept of the disclosure, so that the user can considerably quick and easily perform touch operations.

Compared with the conventional handwriting manner of character input, the disclosure no longer requires entirely writing desired input characters and thus is more efficient. In addition, in the disclosure, only the number information and position information of touch point corresponding to input characters are needed to be stored, thereby each of the input characters needs less storage space and the storage space is saved consequently.

In addition, compared with the character input manner on the assist of software keyboard, the disclosure allows users to continuously and quickly input characters, without the need of moving the cursor to select desired characters. As a result, the disclosure has an improved character input efficiency.

Moreover, the disclosure can be further applied to a sentence input. That is, preset touch point groups can be predefined to represent common-use sentences for input, and the function of the preset touch point groups in the disclosure somehow is equivalent to the shortcut keys. Detailed description for the sentence input can be analogized from the aforementioned single character input and thus will not be repeated herein.

In practical applications, the execution of the method for converting touch points into characters as input is not limited to an electronic device. In addition, the method of converting touch points into characters as input in accordance with the disclosure can be applied to various types of computer program products. That is, any computer program product, which stores with a software program for use with an input interface and is executable to drive an electronic device with a control unit to perform the foregoing converting method, is the potential application of the disclosure.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for converting at least one touch point into a character, applied to an input interface of a touch device comprising a processor and a non-transitory computer-readable storage medium, the method comprising:
    sensing the at least one touch point triggered by a user on the input interface to obtain a first touch point number information and a first touch point position information, wherein a touch point corresponds to a discrete single position;
    determining whether the first touch point number information matches with a predetermined touch point number information representative of an input character;
    determining whether the first touch point position information matches with a predetermined touch point position information representative of the input character, wherein the first touch point position information comprises an angle and a distance; and
    determining the sensed touch point to be the input character based on a determination that the first touch point number information matches with the predetermined touch point number information representative of the input character and a determination that the first touch point position information matches with the predetermined touch point number information and the predetermined touch point position information representative of the input character;
    wherein, said predetermined touch point number information and said predetermined touch point position information representative of the input character are contained in a lookup table.

2. The method according to claim 1, wherein the step of sensing the at least one touch point triggered by the user on the input interface and obtaining the first touch point number information and the first touch point position information of the sensed at least one touch point comprises:
    counting the at least one touch point sensed in a predetermined period and thereby obtaining the first touch point number information.

3. The method according to claim 1, wherein if the first touch point number information indicates that only one touch point is sensed, the only one touch point represents that the user only triggers a first touch point located at a first coordinate position on the input interface, and the first touch point position information contains the first coordinate position; and if the first touch point number information indicates that multiple touch points are sensed, the multiple touch points represent that the user at least triggers the first touch point and a second touch point respectively located at the first coordinate position and a second coordinate position on the input interface, and correspondingly the first touch point position information contains the first coordinate position and the second coordinate position.

4. The method according to claim 1, wherein the input character comprises symbols, letters or numerals.

5. The method according to claim 1, wherein the angle is an intersection angle of the at least one touch point with respect to a horizontal central axis x or a vertical central axis y.

6. The method according to claim 1, wherein the distance is between the at least one touch point and a horizontal central axis x or a vertical central axis y.

7. The method according to claim 1, wherein the distance is between the at least one touch point and a central coordinate point.

8. The method according to claim 1, wherein the angle is a relative intersection angle among the at least one touch point, and the distance is a relative distance among the at least one touch point.

9. A touch device for converting at least one touch point into a character, comprising:
    a recognition unit, for sensing the at least one touch point triggered by a user on an input interface to obtain a first touch point number information and a first touch point position information of the at least one touch point, wherein a touch point corresponds to a discrete single position;
    a control unit, electrically coupled to the recognition unit, for determining whether the first touch point number information matches with a predetermined touch point number information representative of an input character, determining whether the first touch point position information matches with a predetermined touch point position information representative of the input character, and determining the sensed touch point to be the input character based on a determination that the first touch point number information matches with the predetermined touch point number information representative of the input character and a determination that the first touch point position information matches with the predetermined touch point number information and the predetermined touch point position information representative of the input character; and
    a storage unit, coupled to the recognition unit and the control unit, for providing a lookup table;
    wherein, said first touch point number information and said first touch point position information representative of the input character are contained in said lookup table, and the first touch point position information comprises an angle and a distance.

10. The touch device according to claim 9, wherein the recognition unit obtains the touch point number information triggered by the user input through counting the at least one touch point sensed in a predetermined period.

11. The touch device according to claim 9, wherein if the first touch point number information indicates that only one touch point is sensed, the only one touch point represents that the user only triggers a first touch point located at a first coordinate position on the input interface, and the touch point position information contains the first coordinate position; and if the first touch point number information indicates that multiple touch points are sensed, the multiple touch points represent that the user at least triggers the first touch point and a second touch point respectively located at the first coordinate position and a second coordinate position on the input interface, and the first touch point position information contains the first coordinate position and the second coordinate position.

12. The touch device according to claim 9, wherein the input character comprises symbols, letters or numerals.

13. A non-transitory computer-readable medium encoded with a computer program, the computer program being executed by an electronic device to convert at least one touch point triggered by a user on an input interface of the electronic device into a character by steps comprising:
   sensing the at least one touch point triggered by a user on the input interface to obtain a first touch point number information and a first touch point position information according to the sensed at least one touch point, wherein a touch point corresponds to a discrete single position;
   determining whether the first touch point number information matches with a predetermined touch point number information representative of an input character;
   determining whether the first touch point position information matches with a predetermined touch point position information representative of the input character, wherein the first touch point position information comprises an angle and a distance; and
   determining the sensed touch point to be the input character based on a determination that the first touch point number information matches with the predetermined touch point number information representative of the input character, and a determination that the first touch point position information matches with the predetermined touch point number information and the predetermined touch point position information representative of the input character;
   wherein, said first touch point number information and first said touch point position information representative of the input character are contained in a lookup table.

14. The non-transitory computer-readable medium according to claim 13, wherein the step of sensing the at least one touch point triggered by the user on the input interface to obtain the first touch point number information and the first touch point position information of the sensed at least one touch point comprises:
   counting the at least one touch point sensed in a predetermined period and thereby obtaining the first touch point number information.

15. The non-transitory computer-readable medium according to claim 13, wherein if the first touch point number information indicates that only one touch point is sensed, the only one touch point represents that the user only triggers a first touch point located at a first coordinate position on the input interface, and the touch point position information contains the first coordinate position; and if the first touch point number information indicates that multiple touch points are sensed, the multiple touch points represent that the user at least triggers the first touch point and a second touch point respectively located at the first coordinate position and a second coordinate position on the input interface, and the first touch point position information contains the first coordinate position and the second coordinate position.

16. The non-transitory computer-readable medium according to claim 13, wherein the input character comprises symbols, letters or numerals.

* * * * *